United States Patent [19]

Neff

[11] 4,298,027

[45] Nov. 3, 1981

[54] THREE-WAY NORMALLY CLOSED PILOT VALVE

[75] Inventor: James A. Neff, Bloomfield Township, Oakland County, Mich.

[73] Assignee: Mac Valves, Inc., Wixom, Mich.

[21] Appl. No.: 14,245

[22] Filed: Feb. 22, 1979

[51] Int. Cl.³ ............................................. F15B 13/044
[52] U.S. Cl. ........................... 137/625.65; 137/DIG. 7
[58] Field of Search ....................... 137/625.65, DIG. 7

[56] References Cited

U.S. PATENT DOCUMENTS

| | | | |
|---|---|---|---|
| 3,080,888 | 3/1963 | Brinkel | 137/625.65 |
| 3,202,182 | 8/1965 | Haviland | 137/625.65 X |
| 3,329,165 | 7/1967 | Lang | 137/625.5 |
| 3,538,954 | 11/1970 | Fagerlie et al. | 137/625.65 |
| 4,187,884 | 2/1980 | Loveless | 137/DIG. 7 |

*Primary Examiner*—Gerald A. Michalsky
*Attorney, Agent, or Firm*—Robert G. Mentag

[57] ABSTRACT

A three-way, normally closed only, pilot valve for supplying pressurized pilot air to a fluid flow control valve, such as a four-way valve, a three-way valve, a two-way valve, or the like, for shifting the main spool valve of such valves. The pilot valve includes a valve body with a pressurized pilot air inlet port, a cylinder port, and an exhaust port. The inlet port is connected by a first passageway to the cylinder port. The cylinder port is connected by a second passageway to the exhaust port. A poppet spool valve is movably mounted in the valve body between an inoperative position for blocking the first passageway means, and an operative position for opening the first passageway means and blocking the second passageway means. A spring and air assist return means moves the poppet spool valve to the inoperative position. A solenoid moves the poppet spool valve to the operative position. The poppet spool valve has only one dynamic seal. The pilot valve includes a pair of longitudinally spaced apart, sharp edged valve seats which are alternately engaged, by a pair of longitudinally spaced annular valve members on the poppet spool valve, when the poppet spool valve is moved between the operative and inoperative positions.

2 Claims, 3 Drawing Figures

U.S. Patent  Nov. 3, 1981  4,298,027
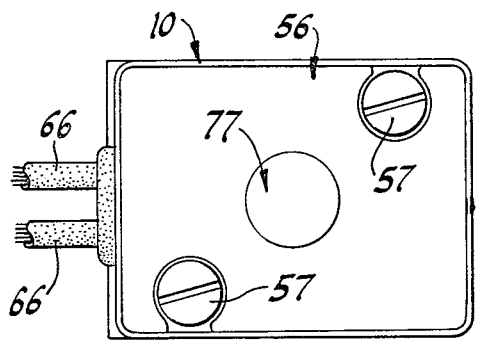
Fig. 3
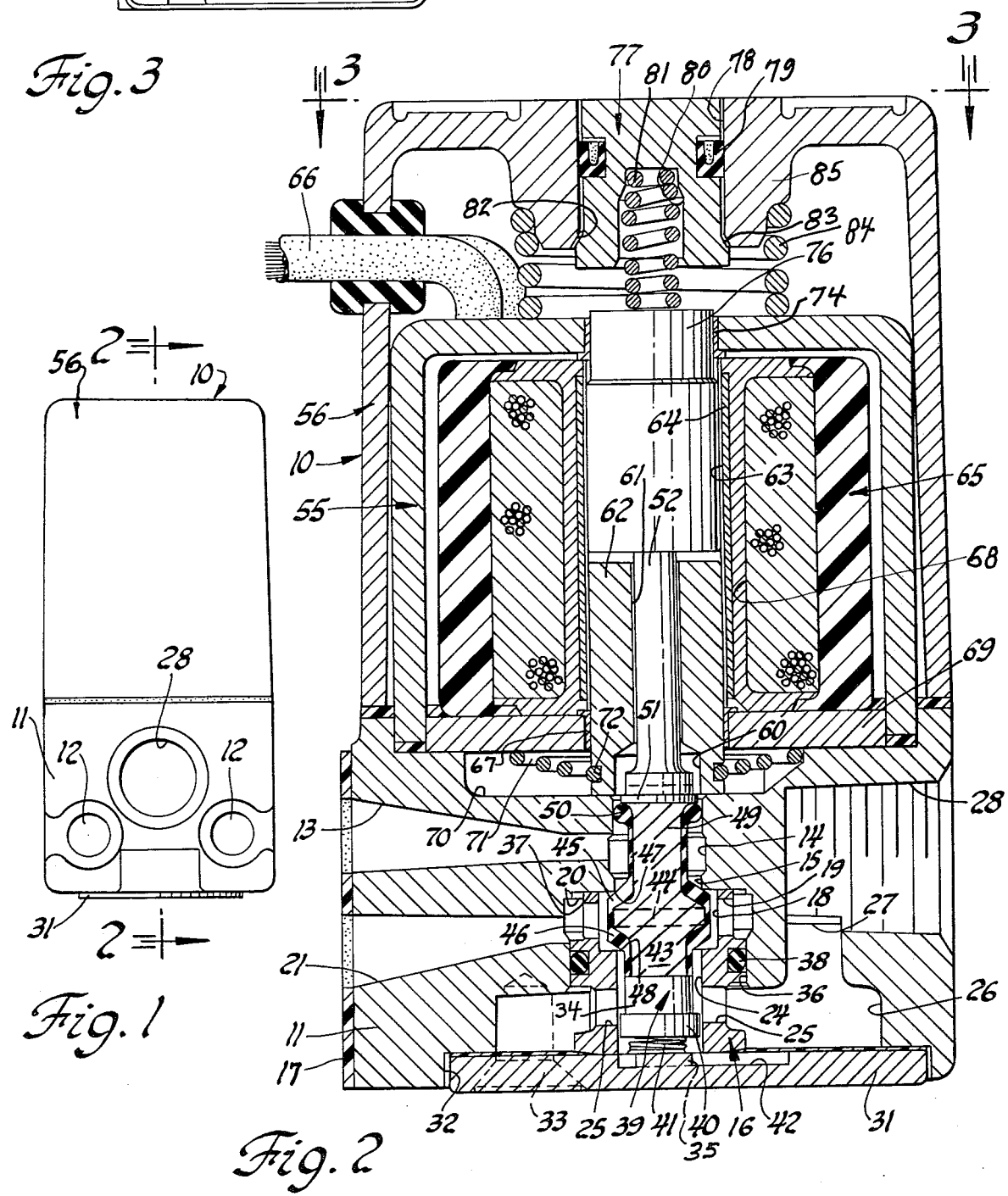
Fig. 1
Fig. 2

THREE-WAY NORMALLY CLOSED PILOT VALVE

BACKGROUND OF THE INVENTION

1. Field of the Invention

This invention relates generally to air valves, and more particularly, to a three-way, normally closed only, pilot valve for use in controlling the flow of pilot air to a directional flow control valve for operating the main spool valve thereof. The type of directional flow control valves which may be controlled by the pilot valve of the present invention includes four-way valves, three-way valves, two-way valves, and the like.

2. Description of the Prior Art

It is known in the air valve art to provide solenoid operated pilot air valves for use in controlling the flow of pilot air to directional flow control valves. A disadvantage of the prior art pilot air valves is that they require at least two dynamic air seals. A further disadvantage of the prior air pilot air valves is that they include a valve spool which is shifted in one direction by a solenoid, and shifted in the other direction by a return spring when the solenoid is de-energized. Another disadvantage of the prior art pilot air valves as if they are of the poppet type they are balanced and subject to pressure limitations based on orifice size. If they are of the balanced spool type they require no longer solenoid strokes and have at least three dynamic seals. If they are of the balanced spool-poppet type, as shown in U.S. Pat. No. 3,538,954, they have the short solenoid stroke of the poppet type but have two dynamic air seals.

SUMMARY OF THE INVENTION

In accordance with the invention, a three-way, normally closed only pilot air valve is provided for supplying pressurized pilot air to a directional flow control air valve, such as a four-way valve, a three-way valve, a two-way valve, or the like, for shifting the main spool valve of such valves. A valve body has a pilot air inlet port, a cylinder port, and an exhaust port. A first passageway interconnects the inlet port and the cylinder port. A second passageway interconnects the cylinder port and the exhaust port. A poppet spool valve is movably mounted in the valve body for movement between a normally closed inoperative position, and an operative position, so that when the poppet spool valve is in the inoperative position, it blocks the first passageway and opens the second passageway, and when it is in the operative position, it opens the first passageway and blocks the second passageway. A solenoid is energized to move the poppet spool valve from the inoperative position to the operative position. The poppet spool valve is returned to the inoperative position, when the solenoid is de-energized, by a return spring, and an air assist provided by pressurized air exhausting from the cylinder port to the exhaust port. A first sharp edged valve seat is disposed between the inlet port and the cylinder port, and a second sharp edges valve seat is disposed between the cylinder port and the exhaust port. A pair of longitudinally spaced apart, annular valve members are carried on the poppet spool valve for alternative engagement with the first and second sharp edged valve seats when the poppet spool valve is in the inoperative and operative positions.

BRIEF DESCRIPTION OF THE DRAWING

FIG. 1 is a side elevational view of a three-way, normally closed only, pilot valve, made in accordance with the principles of the present invention.

FIG. 2 is an enlarged, elevation section view of the pilot valve shown in FIG. 1, taken along the line 2—2 thereof, and looking in the direction of the arrows.

FIG. 3 is a top plan view of the pilot valve shown in FIG. 2, taken along the line 3—3 thereof, and looking in the direction of the arrows.

DESCRIPTION OF THE PREFERRED EMBODIMENT

Referring now to the drawing, and in particular to FIG. 2, the numeral 10 generally indicates a three-way, normally closed only, pilot valve made in accordance with the principles of the present invention. The pilot valve 10 includes a valve body 11 which is adapted to be operatively mounted on a fluid flow control valve to be controlled by the pilot valve of the present invention, as for example, a 4-way valve, a 3-way valve, a 2-way valve, and the like. As shown in FIG. 1, the valve body 11 is provided with a pair of mounting holes 12 for the reception of suitable mounting bolts to mount the pilot valve 10 onto a fluid flow control valve which it would control. The numeral 17 in FIG. 2 designates a gasket which would be disposed between the pilot valve 10 and the fluid flow control valve on which it would be mounted for controlling the same.

As shown in FIG. 2, the pilot valve 10 is provided with a pilot air inlet passage 13 which would be operatively connected to a passageway in the fluid flow control valve which would be controlled by the pilot valve 10, for the reception of main line pressurized air from the same source that would be used to supply line pressure to said flow control valve. The inner end of the inlet passage 13 communicates with an annular groove 14 which is formed in the wall of an axial bore 15 that is formed in the valve body 11 perpendicular to the longitudinal axis of the inlet passage 13.

As shown in FIG. 2, a valve retainer, generally indicated by the numeral 16, is seated in an enlarged bore 36 in the valve body 11. The upper end of the bore 36 terminates at a transverse shoulder 37, at which point the inner end of the bore 36 communicates with the lower end of the bore 15 and forms a circular, sharp edged valve seat 47. The valve retainer 16 has an inwardly extended bore 18 formed in the upper end thereof which communicates with the bore 15 in the valve body 11. A plurality of radial passageways 19 are formed through the side wall of the valve retainer 16, and they communicate with an aligned annular groove 20 which is formed in the wall of the bore 36, adjacent the upper end thereof. The annular groove 20 communicates with the inner end of a cylinder or outlet passageway 21 which would be connected to the valve spool chamber of the fluid flow control valve controlled by the valve 10.

An axial bore 24 is formed in the valve retainer 16, and it extends from the lower end thereof and communicates at its upper end with the larger diameter bore 18. A plurality of transverse bores or passageways 25 are formed through the lower end wall of the valve retainer 16, and they communicate at their inner ends with the axial bore 24, and at their outer ends with an exhaust chamber 26 which is formed in the lower end of the valve body 11. A passageway 27 connects the exhaust chamber 26 with the inner end of an exhaust port 28. The lower end of the exhaust chamber 26 is enclosed by a bottom plate 31 which is seated in a recess 32 formed in the lower end of the valve body 11. The bottom plate 31 is secured in place by suitable machine screws 33. An O-ring 38 is operatively mounted in a groove around the outer periphery of the valve retainer 16, and it sealingly engages the bore 36 at a position below the annular groove 20.

A poppet valve spool, generally indicated by the numeral 39, is movably mounted in the valve body 1, with the lower portion thereof disposed in the valve retainer bores 18 and 24, and the upper portion therein disposed in the valve body bore 15. The valve spool 39 is provided with an elongated, substantially cylindrical body which has a lower enlarged diameter end 40 which is slidably mounted with a close clearance in the lower end of the valve retainer bore 24. The valve body lower end 40 is seated against the upper end of a valve spool return spring 41. The lower end of the return spring 41 is seated on an abutment member 35 which function as a spring seat. The spool body portion 40 is integral with a reduced diameter portion 34 which is in turn integral with a smaller diameter portion 43. The spool body portion 43 is integral at its upper end with an annular, enlarged diameter flange 44 which is integral with an upper reduced diameter portion 49, which has a diameter equal to the diameter of the spool body portion 43. The spool body portions 43 and 49 are connected to the annular flange 44 by outwardly tapered body portions which converge outwardly toward the outer periphery of the flange 44 to form upper and lower, spaced apart, peripheral conical surfaces. The upper end of the spool body portion 49 is integrally connected with an enlarged diameter flange 51 which is integral with an extension or operating shaft 52 that is operated by a conventional solenoid, as explained hereinafter.

As shown in FIG. 2, a pair of annular, tapered, longitudinally spaced apart, valve members 45 and 46 are integrally molded on the upper and lower conical peripheral surfaces, above and below the valve spool body flange 44, respectively. The outer faces of the valve members 45 and 46 are conically shaped, and they converge toward each other. The adjacent ends of the annular valve members 45 and 46 are integrally connected. The lower end of the annular valve member 46 is connected to an integrally molded cylindrical extension of the same material from which the valve member is made, and it extends downwardly to a shoulder formed between the inner end of the spool body portion 34 and the spool body portion 43. As shown in FIG. 2, a dynamic O-ring type annular seal member 50 is integrally molded to the upper annular valve member 45, in a position longitudinally spaced apart therefrom, and adjacent the lower end of the flange 51 on the valve spool body. The annular seal 50 is adapted to sealingly engage the upper end of the axial bore 15 in the valve body 11. The annular seal 50 is the only dynamic seal employed in the pilot valve 10.

As shown in FIG. 2, the return spring 41 normally biases the valve spool 39 upwardly to the position shown in FIG. 2, with the upper conical annular valve member 45 in seating engagement against the circular sharp edged valve seat 47. The valve spool 39 is shifted downwardly by the hereinafter described solenoid structure so as to move the lower conical annular valve member 46 into seating arrangement on the circular sharp edged valve seat 48 formed by the junction of the upper end of the valve retainer bore 24 and the shoulder at the lower end of the larger diameter valve retainer bore 18.

As shown in FIG. 2, the valve spool operating shaft 52 is operatively mounted through an enlarged diameter axial bore 60 and a communicating smaller diameter axial bore 61 in a cylindrical pole piece 62. The pole piece 62 is mounted in a bore 63 of a core guide 64 which is axially mounted in a bore 68 in a conventional solenoid coil assembly which is generally indicated by the numeral 65. The numeral 66 designates the conventional lead wires for the coil assembly 65.

The lower end of the pole piece 62 is slidably supported in a bushing 67 which is operatively mounted in a transverse flux plate 69. The lower end of the pole piece 62 is seated in a recess or chamber 70 that is formed in the upper end of the valve body 11. The pole piece 62 is biased into seating engagement with the inner end wall of the chamber 70 by a spring 71 which has its upper end abutting the lower side of the flux plate 60 and its lower end operatively mounted in an annular groove 72 formed around the lower end of the pole piece 62.

A solenoid armature 76 is slidably mounted in the upper end of the core guide 64 and its upper end is slidably mounted through a bushing 74 which is mounted in the upper transverse wall of a conventional solenoid C-frame, generally indicated by the numeral 55. The previously described solenoid structure is enclosed by a suitable solenoid cover, generally indicated by the numeral 56, which is secured to the valve body 11 by suitable machine screws 57 (FIG. 3). A load spring 84 is seated in the solenoid cover 56 and its upper end abuts a boss 85 which is integrally formed on the inner side of the end wall of the solenoid cover 56. The lower end of the load spring 84 abuts the outer upper side of the transverse wall of the solenoid C-frame 55. A manual operator, generally indicated by the numeral 77, is slidably mounted in a bore 78 in a boss 85. A suitable cup seal 79 is mounted around the operator 77 and it engages the bore 78. The operator 77 is shown in an inoperative position in FIG. 2. A return spring 81 has its outer end seated in a friction gripping engagement in an axial bore 80 that is formed in the inner end of the operator 77. When the operator 77 is in the inoperative position, the inner end of the spring 81 does not engage the outer end of the armature 76 but is slightly spaced apart therefrom in close proximity thereto. The inner end of the bore 78 is tapered outwardly to form an annular tapered seat 82 against which the outwardly tapered annular shoulder 83 on the operator 77 is seated when the operator 77 is in the inoperative position shown in FIG. 2.

In use, the pilot valve 10 would be mounted on a fluid flow control main valve such as a four-way valve, a three-way valve, a two-way valve, or the like, for controlling the operation of the main valve spool of such a valve. The inlet or supply passage 13 would be supplied with pilot air under pressure for shifting said main spool valve. The pressurized pilot air could be supplied from the same pressurized air supply line for the main valve or from an independent supply source. The pilot air would be blocked from the cylinder port or outlet passage 21 when the poppet spool valve 39 is in the inoperative position shown in FIG. 2, because the upper annular valve member 45 is seated against the circular sharp edged valve seat 47 to block the flow of pilot air from the inlet passageway. When the solenoid coil 65 is energized, the armature 76 pushes down on the valve spool operating shaft 52 to shift the poppet spool valve 39 downwardly so that the lower annular valve member 46 seats on the lower valve seat 48, whereby the inlet passage 13 is open to the cylinder port or outlet passage 21 to permit the flow of pilot air through the annular groove 14, the bore 15, the radial passageways 19, the annular groove 20 and thence into the outlet passageway 21. The pilot air is fed from the outlet passage 21 into the fluid flow control valve which is being controlled for shifting the main spool valve of the same. When the solenoid coil 65 is de-energized, the poppet spool valve 39 is moved upwardly by the return spring 41 to return the poppet spool valve 39 to the inoperative position shown in FIG. 2 to again block the inlet pilot air because of the upper annular valve member 45 seating on the valve seat 47. The last described upward movement of the poppet spool valve 39 allows the pilot air in the valve being controlled to pass back through the outlet passageway 21 and exhaust down through the retainer bore 24 and out through the exhaust chamber 26 and the passage 27 to the exhaust port 28. The lower end 40 of the poppet valve spool 39 is formed with an enlarged diameter and it is mounted in the retainer bore 24 with a close clearance, so that a substantially balanced condition is present between the lower end 40 of the poppet spool 39 and the lower side of the lower annular valve member 46 under such an exhausting operation. However, the exhausting air pressure will leak past the poppet spool valve enlarged diameter lower end portion 40 and react against the lower end of the poppet spool valve 39 to provide an unbalanced condition to provide an air assist to the return action of the spring 41 for positively moving the poppet valve spool 39 upwardly to the inoperative position shown in FIG. 2. The air exhausted from the outlet passageway 21 and downwardly through the exhaust chamber 26 is also allowed to leak under the poppet valve spool 39 by means of the air passage 42 which connects with the exhaust chamber 26 and communicates with the lower end of the retainer bore 24 under the poppet valve spool 39.

The air assist return action on the poppet spool valve 39 is an advantage because heretofore the valve spools of solenoid operated pilot valves were returned to their inoperative position when the solenoid was de-energized by the return spring action alone. Heretofore, any problems occurring in the operation of pilot spool valves normally occurred during the de-energization of the valve. Such problems are avoided with the construction of the poppet spool valve 39 of the present invention because of the air assist provided to the spring 41 when the solenoid coil 65 is de-energized.

A further advantage of the pilot valve of the present invention is that there is only one dynamic seal 50. Normally, the similar prior art solenoid operated pilot valves had at least two dynamic seals. Accordingly, the pilot valve of the present invention is constructed with a minimum of dynamic or moving seals so as to reduce the friction esulting from such seals to a minimum. It will be seen that the poppet spool valve 39 is balanced between the one dynamic seal 50 and the annular seal member 45. The employment of the closely spaced, sharp edged valve seats 47 and 48, and the employment of the high speed of the solenoid actuator allows the poppet spool valve 39 to be quickly shifted downwardly to the operative position. despite the fact that the poppet spool valve 39 is instantaneously unbalanced when it is shifted downwardly since the pressurized pilot air from passage 13 can instantaneously pass around the valve seats 45 and 46 and downwardly into the exhaust chamber 26 before the lower valve seat 46 seats on the lower valve seat 48. However, the enlarged diameter of the lower end 40 of the poppet spool valve 39 functioning as a baffle, and the high speed shifting of the solenoid, does not allow the pilot air which is instantaneously escaping into the exhaust chamber 26 to jet down into the exhaust chamber 26 and cause an imbalance which would delay or hinder the downward movement of the poppet spool valve 39 to the operative position with the valve member 46 on the valve seat 48.

While it will be apparent that the preferred embodiment of the invention herein disclosed is well calculated to achieve the results aforestated, it will be appreciated that the invention is susceptible to modification, variation and change.

What is claimed is:

1. A three-way, normally closed only, pilot air valve including a valve body with a pressurized pilot air inlet port, a cylinder port, and an exhaust port, characterized in that:
 (a) said valve body has a bore formed therethrough;
 (b) a tubular valve retainer member, having an axial bore formed therethrough, is operatively mounted in one end of said valve body bore in a position between the cylinder port and the exhaust port, and it has a tubular side wall and an inner end and an outer end;
 (c) a first passageway means is formed through the valve body and it interconnects said pressurized pilot air inlet port to the valve body bore at the other end thereof;
 (d) a second passageway means if formed through the valve body and it extends laterally through the tubular side wall of the valve retainer member, adjacent the inner end thereof, and it interconnects said cylinder port with the axial bore in the valve retainer member;
 (e) a third passageway means is formed through the valve body, and it extends laterally through the tubular side wall of the valve retainer member, adjacent the outer end thereof, and it interconnects said exhaust port with the axial bore in the valve retainer member;
 (f) a first circular sharp edged poppet valve seat is formed in the valve body bore between the first passageway means and the second passageway means, and a second circular sharp edged poppet valve seat is formed in the axial bore of the valve retainer member between the second passageway means and the third passageway means;
 (g) a poppet spool valve is movably mounted in said valve body between a normally closed inoperative position and an open operative position, with a first portion thereof being slidably mounted in said valve body bore, and a second portion thereof being slidably mounted in the axial bore in the valve retainer member;
 (h) said poppet spool valve is provided with a first conical annular valve member and a longitudinally spaced apart second conical annular valve member for sealing engagement with the first and second circular sharp edged poppet valve seats, respectively, so that when the poppet spool valve is in the inoperative position the first conical annular valve member is seated on the first circular sharp edged poppet valve seat and the poppet spool valve blocks the first passageway means from communication with the second passageway means through the valve body bore and the axial bore in the valve retainer while simultaneously the second conical annular valve member is unseated to open communication between the second and third passageway means through the valve body bore and the axial bore in the valve retainer member, to allow the air under pressure entering said cylinder port to be exhausted out said exhaust port, and when the poppet valve spool is in the operative position the second conical annular valve member is seated on the second circular sharp edged poppet valve seat and the poppet spool valve blocks the communication between the second and third passageway means and the first conical annular valve member is unseated to open communication between the first and second passageway means to allow pressurized pilot air to flow from the pilot air inlet port to the cylinder port;

(i) a solenoid operatively engaged with one end of said poppet spool valve for moving the poppet spool valve from an inoperative position to an operative position;

(j) the poppet spool valve is normally biased to the inoperative position by means which includes a return spring means engaged with the other end of the poppet spool valve;

(k) said poppet spool valve is provided at said other end with an enlarged diameter end which is mounted in the axial bore in the valve retainer with a close clearance and engaged on its outer end by said return spring means, and the third passageway means extends through the tubular side wall of the valve retainer member to communicate with the axial bore in the retainer member at a point between said enlarged diameter end and said second conical annular valve member, so that a substantially balanced condition is present between said enlarged diameter end of the poppet spool valve and the lower side of the second conical annular valve member during an exhausting flow of air under pressure from the second passageway means to the third passageway means;

(l) said means for normally biasing the poppet spool valve to the inoperative position also includes a fourth air passageway means in the valve that communicates the outer end of the axial bore in the retainer member, at a point outward of said poppet valve enlarged diameter end, with the third passageway means to allow air exhausting from the cylinder port to the exhaust port to leak past said enlarged diameter valve end and fourth passageway means to engage said other end of the poppet spool valve for assisting the return spring means in moving the poppet spool valve from the operative position to the inoperative position;

(m) said poppet spool valve is provided with only one dynamic seal; and, (n) said first and second conical annular valve members are longitudinally spaced apart on the poppet spool valve and are disposed with their valve seat engaging faces converging toward each other, in a direction radially outward from the longitudinal axis of the poppet spool valve, so that the first and second conical annular valve members are angularly disposed when they engage their respective valve seats.

2. A three-way, normally closed, pilot valve as defined in claim 1, characterized in that:

(a) said dynamic seal, and said first and second conical annular valve members are integrally molded on the poppet spool valve.

* * * * *

UNITED STATES PATENT OFFICE
CERTIFICATE OF CORRECTION

Patent No. 4,298,027            Dated November 3, 1981

Inventor(s)    James A. Neff

It is certified that error appears in the above-identified patent and that said Letters Patent are hereby corrected as shown below:

Column 1, line 26, "as" should be --is--.
Column 1, line 27, "balanced" should be --unbalanced--.
Column 1, line 29, delete "no".
Column 1, line 62, "edges" should be --edged--.
Column 3, line 11, "1" should be --11--.
Column 6, line 36, "if" should be --is--.

Signed and Sealed this

Twenty-sixth Day of January 1982

[SEAL]

Attest:

Attesting Officer

GERALD J. MOSSINGHOFF
Commissioner of Patents and Trademarks